(12) United States Patent
Tengler et al.

(10) Patent No.: US 8,213,861 B2
(45) Date of Patent: Jul. 3, 2012

(54) METHOD OF VEHICLE TO VEHICLE COMMUNICATION

(75) Inventors: Steven C. Tengler, Grosse Pointe Park, MI (US); Ryan J. Wasson, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 1063 days.

(21) Appl. No.: 11/967,354

(22) Filed: Dec. 31, 2007

(65) Prior Publication Data

US 2009/0170434 A1 Jul. 2, 2009

(51) Int. Cl.
*H04B 7/00* (2006.01)
(52) U.S. Cl. ........................ 455/41.2; 455/41.1; 455/517
(58) Field of Classification Search .................... 455/39, 455/41.1, 41.2, 517, 556.1, 575.9
See application file for complete search history.

(56) References Cited

U.S. PATENT DOCUMENTS

| | | | |
|---|---|---|---|
| 6,714,791 B2 * | 3/2004 | Friedman | 455/456.1 |
| 2003/0229414 A1* | 12/2003 | Nakazawa et al. | 700/175 |
| 2005/0215283 A1* | 9/2005 | Camp, Jr. | 455/556.2 |
| 2008/0177549 A1* | 7/2008 | Brown et al. | 704/270 |

* cited by examiner

*Primary Examiner* — Tuan H Nguyen
(74) *Attorney, Agent, or Firm* — Anthony L. Simon; Reising Ethington P.C.

(57) ABSTRACT

A method of communicating information that has been formatted for Internet publication from a principal vehicle using short range wireless communication components to communicate with a second vehicle. The method includes storing a web page (blog, social networking page, etc.) or other information formatted for Internet publication in the principal vehicle. An introductory signal is transmitted to the second vehicle. A communication link is established between the principal vehicle and the second vehicle using the respective short range wireless communication components. The second vehicle is then queried for authorization to transmit the information and, if given, the information is then transmitted to the second vehicle via the communications link. User-selected categories can be used to identify common interests between users of the two vehicles. The method can be used to share user information with other potentially interested drivers to facilitate human interactions and relationships.

16 Claims, 4 Drawing Sheets

METHOD OF VEHICLE TO VEHICLE COMMUNICATION

TECHNICAL FIELD

The present invention relates generally to a method for communicating data and, more particularly, to a communications method that allow electronic communication between multiple telematics equipped vehicles in local proximity.

BACKGROUND OF THE INVENTION

Flexible Computing Platform (FCP) is a communications platform that includes a 5.9 GHz enabled, wireless communications chip that is capable of interacting with nearby vehicles (less than 700 m) via Dedicated Short Range Communications (DSRC). DSRC is a wireless band dedicated by the Federal Communications Commission (FCC) for the use of safety and non-safety vehicular communications, be it vehicle-to-vehicle or vehicle-to/fro-infrastructure. Once the chip and associated radio components are resident in the vehicle, there is essentially no incremental cost of inter-vehicle communications for additional applications that use this communication link, as the hardware and the energy to operate the hardware will already be onboard.

Pertinent background information for the present invention also resides in one unmet, non-safety-related need: human relationships. As can be see from the chart below, as presented in Williams, Brian; Stacey C. Sawyer, Carl M. Wahlstrom (2005), *Marriages, Families & Intimate Relationships*. Boston, Mass.: Pearson. 0-205-36674-0, the number of single-adult households is on the rise and is predicted to exceed the number of dual-adult households in 2010.

| | Families (69.7%) | | | | Non-families (31.2%) | | |
|---|---|---|---|---|---|---|---|
| | Married couples (52.5%) | | | | | | |
| | Nuclear | Without | | Other blood | Singles (25.5%) | | |
| Year | family | children | Single Parents | relatives | Male | Female | Other non-family |
| 2000 | 24.1% | 28.7% | 9.9% | 7% | 10.7% | 14.8% | 5.7% |
| 1970 | 40.3% | 30.3% | 5.2% | 5.5% | 5.6% | 11.5% | 1.7% |

"Just under 2.2 million couples married in 2003 . . . [constituting] the lowest overall rate of all time . . . and lower than the 7.9 per thousand at the dismal heart of the Great Depression in 1932," (NCHS 2004, U.S. Statistical Abstracts 2001 and 1970). Many factors have been attributed to this decline in unions, but the emergence of MySpace as one of the holders of the title for most monthly hits for a website (as reported by hitwise.com), and the entry of Match.com and eHarmony.com into the list of top 25 websites suggests that people are still interested in finding other people. In 2007, mediapost.com reported that eHarmony has experienced a 626% year-over-year growth in sales (MySpace, Match.com, Mediapost and eHarmony are trademarks of the respective owners.)

Therefore, there is an unmet need to provide electronic communications between vehicles to allow operators and/or passengers of those vehicles to identify common bonds or similarities between those of one motor vehicle in close proximity to those in another motor vehicle.

SUMMARY OF THE INVENTION

According to an aspect of the invention, there is provided a method of communicating information that has been formatted for Internet publication from a principal vehicle equipped with short range wireless communication components to a second vehicle equipped with short range wireless communication components. The method includes storing the information formatted for Internet publication in the principal vehicle. An introductory signal is transmitted to the second vehicle. A communication link is established between the principal vehicle and the second vehicle using the respective short range wireless communication components. The second vehicle is then queried for authorization to transmit the information formatted for Internet publication. The information formatted for Internet publication is the transmitted to the short range wireless communication components on the second vehicle via the communications link between the principal vehicle and the second vehicle.

In accordance with another aspect of the invention, there is provided a method of communicating user information from a principal vehicle equipped with short range wireless communication components to a secondary vehicle equipped with short range wireless communication components. The method includes the steps of: (a) accessing a third party website containing information provided by the user; (b) identifying user information from the website to be supplied to one or more secondary vehicles; (c) transmitting the user information to a central facility operated by a telematics service provider; (d) downloading the user information from the central facility to a principal vehicle; (e) storing the user information at the principal vehicle; (f) detecting a nearby secondary vehicle that is wirelessly accessible to the principal vehicle; (g) transmitting the user information from the principal vehicle to the secondary vehicle; and (h) presenting the user information to a user of the secondary vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method of communicating vehicle-to-vehicle described below generally attempts to allow those utilizing the services of third party social/community websites to be able to communicate with each other via a different medium. The transmission of information about someone in a motor vehicle so someone else in another motor vehicle in close proximity provides an opportunity to increase the value of vehicle-to-vehicle communications.

Communications System—

Figure 1:
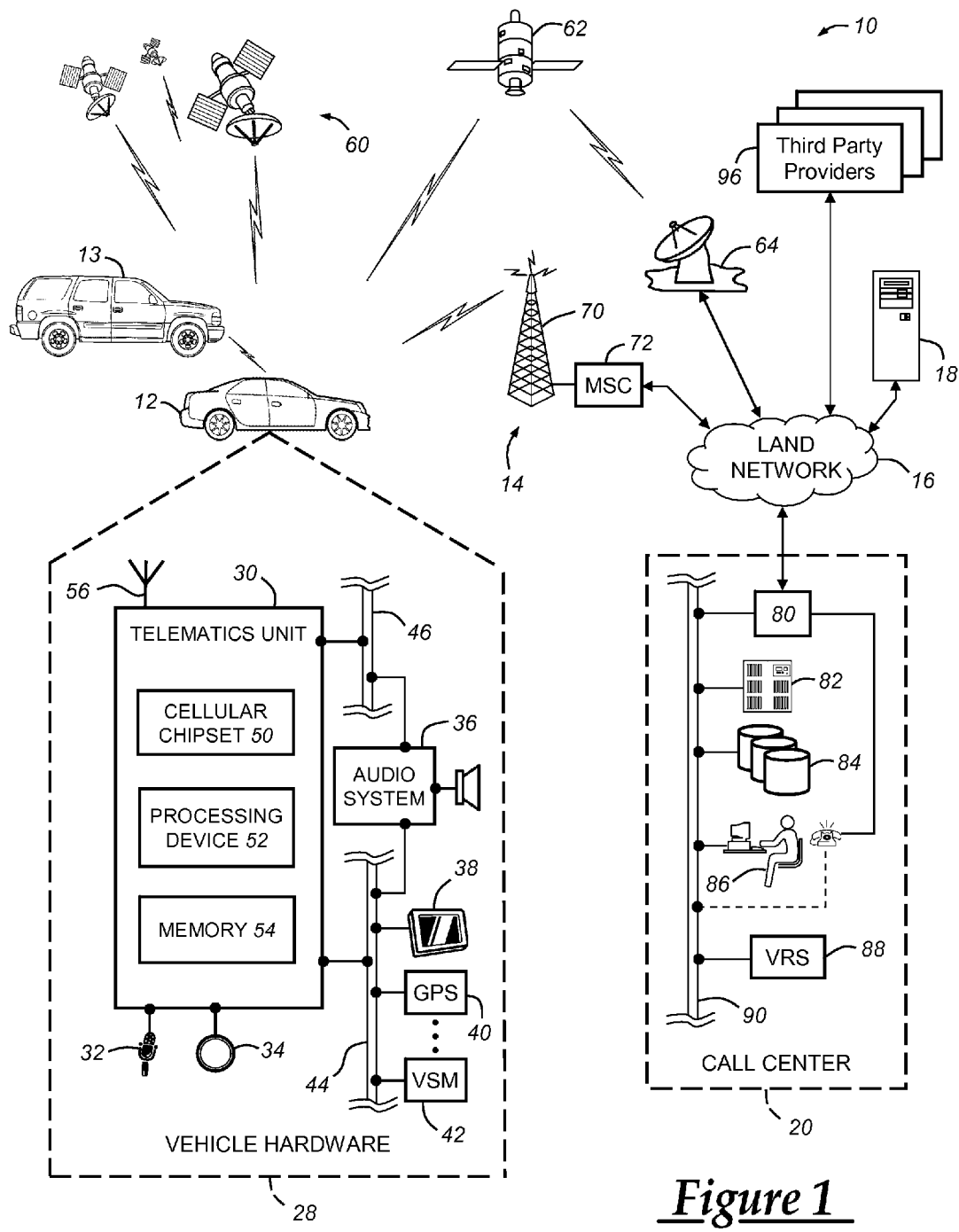
FIG. 1 is a block diagram depicting an exemplary embodiment of a communications system that is capable of utilizing the methods disclosed herein.

With reference to FIG. 1, there is shown an exemplary operating environment that comprises a mobile vehicle communications system 10 and that can be used to implement the method disclosed herein. Communications system 10 generally includes a principal vehicle 12 (about which the focus of the communications system and the inventive method will be), a second vehicle 13 equally equipped with the communications system, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

The principal vehicle 12 (hereinafter either the "principal vehicle 12" or "vehicle 12") is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit 30 and is executed by processor 52, or it can be a separate hardware component located internal or external to the telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wireless according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit 30.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide a myriad of real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in the vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle 12 and enables a vehicle user to communicate with or through a component of the vehicle 12. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. In the disclosed embodiment, computer 18 is a client computer used by the vehicle owner or user to access the Internet including a third party provider 96, such as a social networking provider or personal dating service provider. For example, computer 18 can be the vehicle 12 user's home or work computer.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
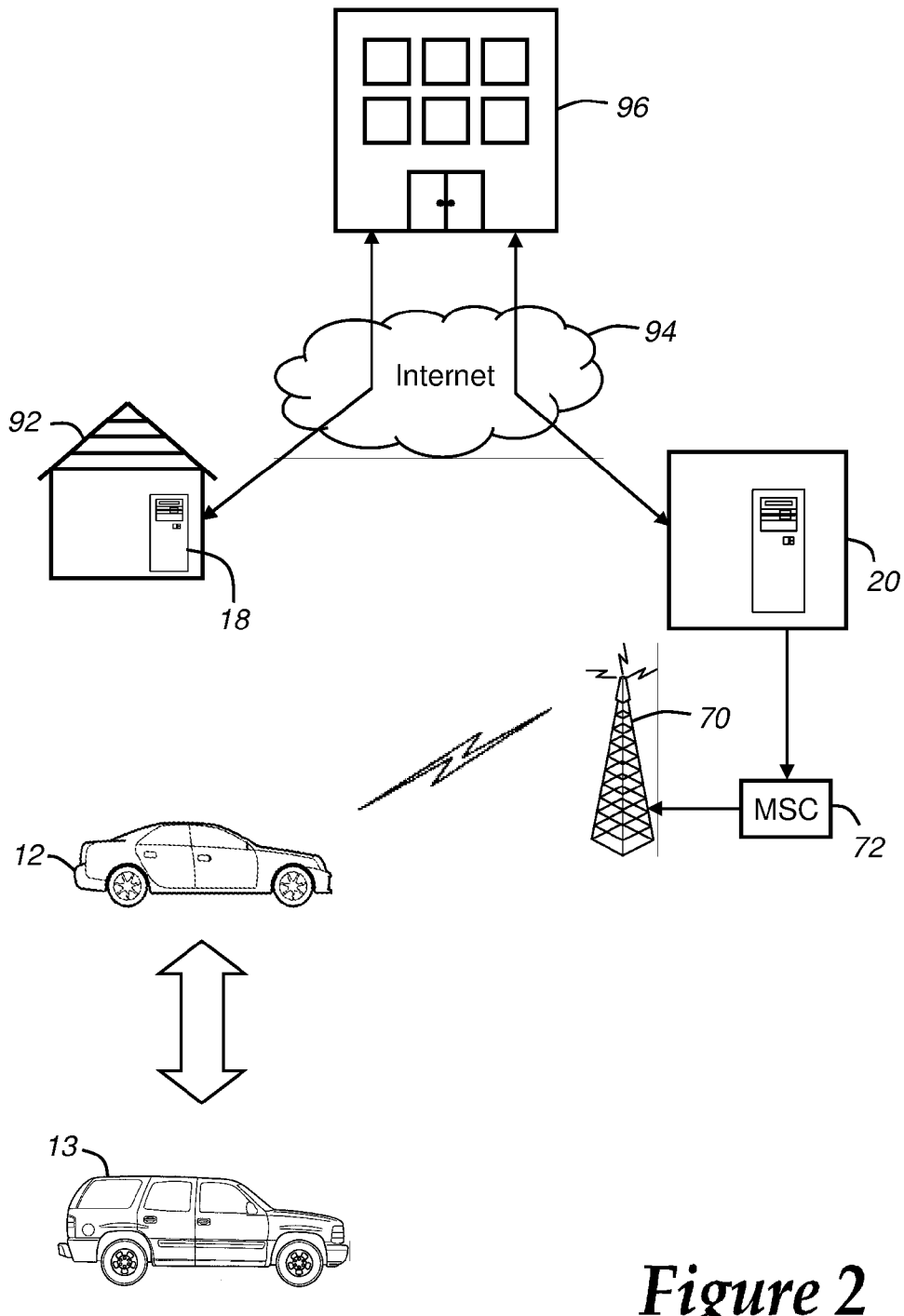
FIG. 2 is a simplified block diagram of the communications system of FIG. 1.

Turning now to FIG. 2, there is shown another view of the operating environment for the mobile vehicle communications system 10 shown in FIG. 1. FIG. 2 shows a simplified view of FIG. 1, removing elements to simplify the discussion of the illustrated method.

In one embodiment, the method allows for vehicle-to-vehicle communication of information that has been formatted for Internet publication. More specifically, the method relates to someone in one vehicle, the principal vehicle 12, transmitting a web page or a portion thereof to someone in another vehicle, the second vehicle 13, that is within a close proximity of the principal vehicle 12 such that the communication of data is transmitted over the FCP in the above-mentioned frequency range of 5.9 GHz. It should be appreciated by those skilled in the art that the frequency set forth above is exemplary and the frequency may vary depending on frequency availability and protocol requirements. In this regard, any suitable direct vehicle to vehicle wireless communication can be used.

To initiate the ability to communicate between vehicles 12, 13 with information formatted for Internet publication (IFIP), a user of the system indicates a desire to have this feature available by selecting the option with the telematics service provider that operates call center 20 and/or with the one or more third party providers 96. Initiating this feature or option can be done in various ways, such as via account access over the Internet or via the vehicle electronics 28 such as by an automated or live interaction with the call center 20 that is initiated by pressing button 34 on the telematics unit 30. In FIG. 2, this initiation of the service is represented by the house 92 in FIG. 2 where the user of the technology (and operator of the principal vehicle 12) will log into one or more of the various services using computer 18 and select the options necessary for authorizing and configuring the vehicle-to-vehicle communication.

The selections made are transmitted through the Internet 94 and received by third party providers 96. Examples of third party providers 96, include but are not limited to, dating services, networking services, hobbyist networks, and the like. These third party providers 96 will provide an option for information pertinent to the user to be downloaded through the Internet 94 to the call center 20 or other server dedicated to communicating with the principal vehicle 12 via the cellular telephone system 70, 72.

The IFIP is then downloaded and stored in the principal vehicle 12 making the principal vehicle 12 ready for vehicle-to-vehicle communication with the second vehicle 13. The IFIP can be stored in memory 54 associated with the vehicle electronics 28 dedicated to operation with the mobile communications system 10.

Figure 3:
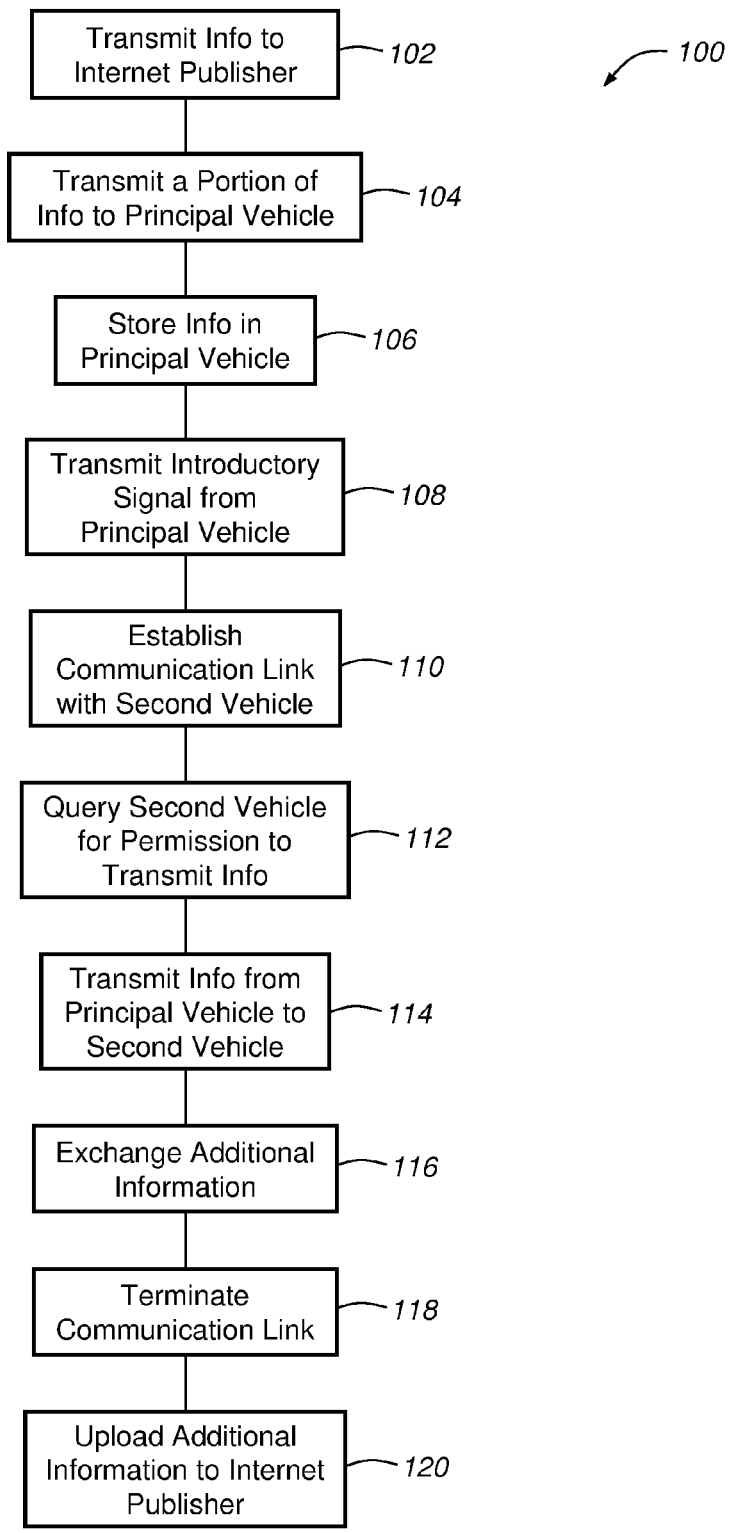
FIG. 3 is a flow chart of one embodiment of a vehicle to vehicle communication method.

Referring to FIG. 3, method 100 begins at 102 with the transmission of IFIP to the Internet publisher, e.g., the third party publisher 96. This step is facilitated by the Internet publisher that may provide a click-on option on its web site that allows a user to authorize the transmission of the data from the Internet publisher to the communication link that allows the information to be sent to the principal vehicle 12. The user may have the opportunity to select which of the IFIP provided may be forwarded onto the principal vehicle 12 or it may send it all. In the latter case, the vehicle electronics 28 may be designed to limit the amount of IFIP that is transmitted therefrom.

Once a user selects the option that IFIP is to be transmitted, a portion, if not all, of the IFIP is transmitted to the principal vehicle 12 at 104. This is done using the mobile communications system 10 discussed above in greater detail. The IFIP is stored in the memory 54 of the telematics unit 30. It will reside there for subsequent broadcast when the principal vehicle 12 is within range of a second vehicle 13 using the communication frequency for the vehicle-to-vehicle communication (5.9 GHz).

The telematics unit 30 is designed to send out a signal to query vehicles within proximity to identify whether or not similar telematics unit are resident therein. This introductory signal is sent at 108. A vehicle-to-vehicle communications link is established at 110. If a second vehicle 13 is within proximity, it may respond. If so, the telematics unit 30 sends a query for permission to transmit the IFIP to the second vehicle 13 at 112. If the second vehicle 13 authorizes the transmission, either automatically or manually, the transmission of the IFIP begins at 114. The IFIP may identify interests or information about the user.

If a mutual interest for further communication arises between the operators of the principal and second vehicles 12, 13, the exchange of additional information occurs at 116. This may include a second layer of IFIP that may be initially withheld. In the alternative, vocal communication, either through the radio link or through a cellular link, may be provided whereby the users actually communicate verbally with each other.

If in the instance where digital information is received by the telematics unit 30 of the principal vehicle 12, it can be temporarily stored in the memory 54 thereof for later use. After the communication has completed, or if the vehicles 12, 13 are no longer within range, the communications link is terminated at 118. If additional information has been obtained from the second vehicle 13, it can be automatically uploaded at 120 to the Internet publisher 96 whereby the user of the principal vehicle 12 may retrieve it using an Internet portal at a convenient site, such as the home 92 of the user.

It may be that more than one second vehicle 13 may be in proximity to the principal vehicle 12 at one time. In this instance, the principal vehicle 12 will transmit an introductory statement along with the IFIP to all the second vehicles 13. Such a statement may be "I have an interest in old trains. If you do too, please contact me at . . . " which could be followed by a phone number or an email address. This way the operator of the principal vehicle 12 may be able to establish momentary links with all of the second vehicles 13 without distracting the operator with multiple "conversations" at one time.

Figure 4:
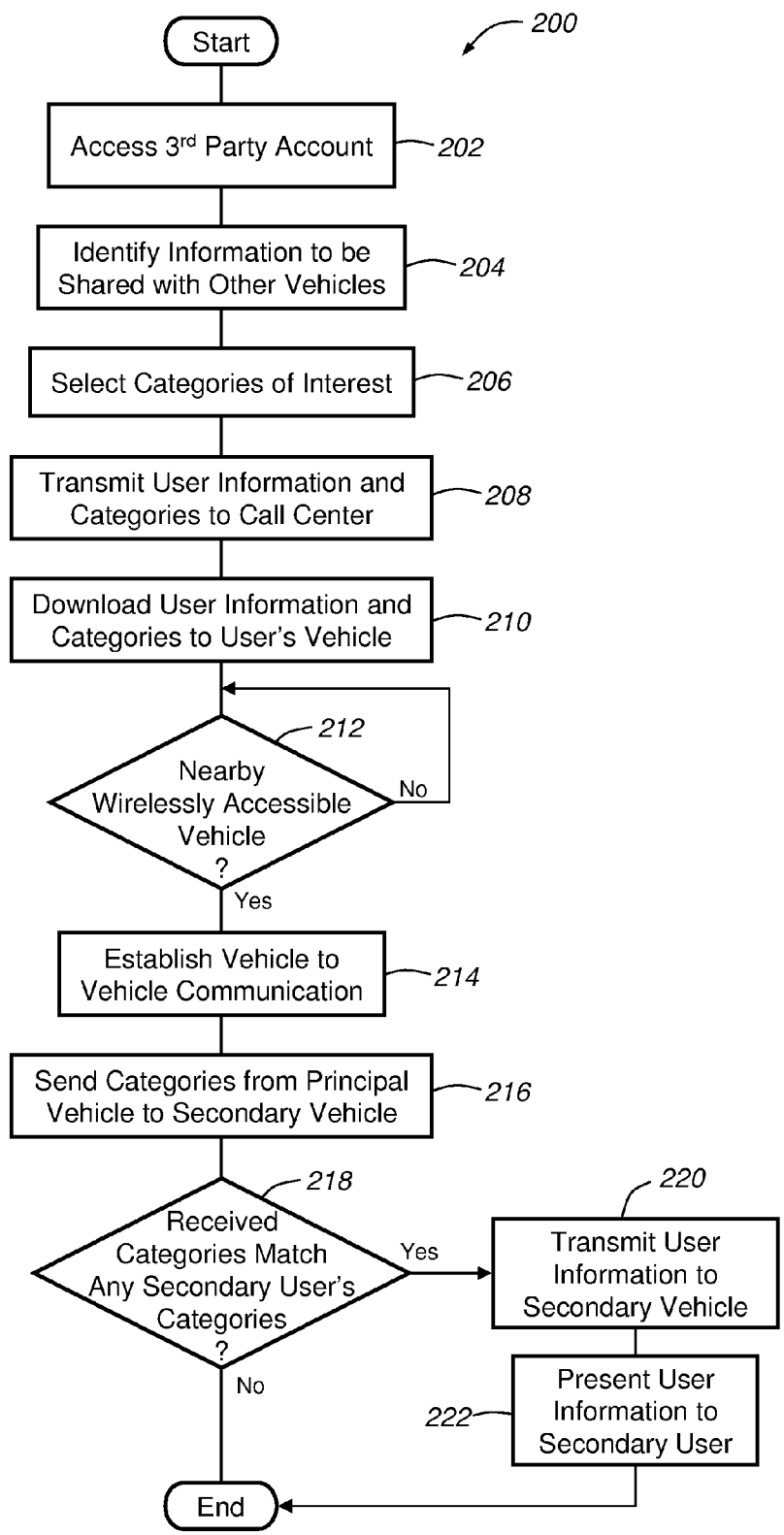
FIG. 4 is a flow chart of another vehicle to vehicle communication method.

FIG. 4 depicts another exemplary method 200 in which the IFIP can comprise a user's blog or portion of a blog, or other personal information that they wish to convey to other potentially interested parties. In this method, IFIP from a user's existing account on a third party's service 96, such as MySpace™, Facebook™, eHarmony™, or Match.com™, is associated with one or more categories of interest to the user, downloaded to the user's vehicle 12, and then made available to other vehicles 13 as they are encountered when driving and/or parking. In particular, the method 200 begins at 202 with the user accessing their third party service 96 account and identifying at step 204 what IFIP or other information they wish to make available to other vehicles 13. This can include all or a portion of the information they have resident on the third party system, such as the contents of a blog or what they have published on a social networking site, both of which will typically comprise IFIP. In addition to or in lieu of this type of information, the selected information can be an Internet link that, for example, operates as an invite to view the user's social networking page, or can be personal information stored at an Internet dating or personals service website.

Then, at step 206, the user can select one or more categories of interest that can be used to determine which vehicles 13 will receive the user's information. For example, the user might identify areas of interest such as, alternative rock music, an age or age range, a particular religion or race, animal rights, model trains, traveling, etc. as categories of interest which will form the basis for another participating vehicle to decide whether to receive the user's information when the two vehicles come within sufficient proximity to communicate wirelessly. Step 206 can be combined with step 204 so that, for example, the determination of what user information is to be supplied to other vehicles 13 can be determined automatically based on the selection of a particular category by the user. Once the user selections are complete, the user information and category information is transmitted from the third party service 96 to another server such as one at the call center 20 so that the vehicle telematics service provider operating the call center 20 can then download the user's information to the vehicle 12 via the wireless network 14. This is shown at step 208. The downloading of the user information (IFIP or otherwise) from the central facility to the vehicle 12 is done at step 210 and can be carried out over network 14 using various communication approaches known to those skilled in the art.

Once downloaded, the vehicle 12 monitors for nearby vehicles with which it can wirelessly communicate, as shown at step 212. Once a vehicle is detected, communication is established, step 214, and the category information stored in vehicle 12 is supplied to the secondary vehicle 13, step 216. This category information is used by vehicle 13 as a filter to determine whether or not to accept the user information from vehicle 12. In this way, a person's vehicle will only accept user information from other vehicles for which the two drivers share some common interest, as determined by the selected categories. Thus, at step 218, a check is made at the secondary vehicle 13 to determine if the received category or categories match one or more of the secondary user's categories stored on vehicle 13. These categories can previously have been obtained by the vehicle 13 in the same manner as those of vehicle 12; that is, by the driver of vehicle 13 using steps 202 to 210 for their vehicle 13. If no match is made, the method ends without any user information being provided to vehicle 13. Alternatively, if there is one or more category matches, the user information is transmitted from the principal vehicle 12 to the secondary vehicle 13 at step 220. Then, the user information is presented to the secondary user at an appropriate time. This presentation can be by display to the driver when the vehicle is parked, or immediately to a back seat display unit, or an audible indication of the received information can be played so that the driver is immediately aware of its receipt. Where the vehicle 13 has communication capability between the vehicle and a computer, PDA, or other information storage accessible to the user of the vehicle 13, the user information received from vehicle 12 can be automatically uploaded to that device for later retrieval and viewing by the driver of vehicle 13.

The methods discussed above can be implemented as a part of a cost-based service provided by the third party providers 96 and vehicle telematics service provider operating the call center 20. For the third party providers 96, their websites include the additional functionality built into the underlying server and database software. Similarly, the call center 20 would include the software necessary to interface with the third party providers 96 and vehicles 12, 13. The cost charged to users could be handled via either the third party providers or telematics service provider with revenue sharing then being carried out between the third party provider and telematics service provider. For example, the configuration of the service by the user can be carried out through the third party provider's website by offering the user the vehicle communication feature as an additional service associated with their account. The user can be charged an incremental cost by the third party provider for this service and a portion of that charged cost can then be supplied by the third party provider to the telematics service provider.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, in the method 200, it is not necessary that the category information be supplied to the secondary vehicle 13 prior to supplying the user information at step 220. Rather, both the user information and categories can be supplied to the vehicle 13 with that user information then either being stored or discarded based on whether there is a match of categories. Also, a user of the disclosed system and method can elect to receive user information at their vehicle without supplying their own information to others. This can be done, for example, by a user accessing their third party account or telematics service provider account and identifying categories for which they would like to receive user information from other vehicles without electing to provide any such of their own information. These and all such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for communicating information that has been formatted for Internet publication from a principal vehicle equipped with short range wireless communication components to a second vehicle equipped with short range wireless communication components, the method comprising the steps of:
storing the information formatted for Internet publication in the principal vehicle;
transmitting an introductory signal to the second vehicle;
establishing a communication link between the principal vehicle and the second vehicle using the respective short range wireless communication components;
querying the second vehicle for authorization to transmit the information formatted for Internet publication; and
transmitting the information formatted for Internet publication to the short range wireless communication components on the second vehicle via the communications link between the principal vehicle and the second vehicle.

2. A method as set forth in claim 1 including the step of receiving communication from the second vehicle in response to receiving the information formatted for Internet publication.

3. A method as set forth in claim 2 including the step of terminating the step of transmitting the information formatted for Internet publication after receiving communication from the second vehicle.

4. A method as set forth in claim 1 including the step of establishing a dialog communication over the communication link after the transmission of the information formatted for Internet publication.

5. A method as set forth in claim 4 including the step of creating communication information from the dialog communication.

6. A method as set forth in claim 5 including the step of transmitting the communication from the principal vehicle to a land network to update the information formatted for Internet publication.

7. A method for communicating information that has been formatted for Internet publication from a principal vehicle equipped with short range wireless communication components to a second vehicle equipped with short range wireless communication components, the method comprising the steps of:
storing the information formatted for Internet publication in the principal vehicle;
transmitting an introductory signal to the second vehicle;
establishing a communication link between the principal vehicle and the second vehicle using the respective short range wireless communication components; and
transmitting the information formatted for Internet publication to the short range wireless communication components on the second vehicle via the communications link between the principal vehicle and the second vehicle.

8. A method as set forth in claim 7 including the step of receiving communication from the second vehicle in response to receiving the information formatted for Internet publication.

9. A method as set forth in claim 8 including the step of terminating the step of transmitting the information formatted for Internet publication after receiving communication from the second vehicle.

10. A method as set forth in claim 9 including the step of establishing a dialog communication over the communication link after the transmission of the information formatted for Internet publication has terminated.

11. A method as set forth in claim 10 including the step of creating communication information from the dialog communication.

12. A method for communicating user information from a principal vehicle equipped with short range wireless communication components to a secondary vehicle equipped with short range wireless communication components, the method comprising the steps of:
(a) accessing a third party website containing information provided by the user;
(b) identifying user information from the website to be supplied to one or more secondary vehicles;
(c) transmitting the user information to a central facility operated by a telematics service provider;
(d) downloading the user information from the central facility to a principal vehicle;
(e) storing the user information at the principal vehicle;
(f) detecting a nearby secondary vehicle that is wirelessly accessible to the principal vehicle;
(g) transmitting the user information from the principal vehicle to the secondary vehicle; and
(h) presenting the user information to a user of the secondary vehicle.

13. A method as set forth in claim 12 wherein the user information includes information that has been formatted for Internet publication.

14. A method as set forth in claim 12 wherein the user information comprises at least a portion of a blog maintained by the user of the principal vehicle.

15. A method for communicating user information from a principal vehicle equipped with short range wireless communication components to a secondary vehicle equipped with short range wireless communication components, the method comprising the steps of:
(a) accessing a third party website containing information provided by the user;
(b) identifying user information from the website to be supplied to one or more secondary vehicles;
(c) identifying one or more categories of interest via the website;
(d) transmitting the user information to a central facility operated by a telematics service provider;
(e) transmitting the one or more categories to the central facility;
(f) downloading the user information from the central facility to a principal vehicle;
(g) downloading the one or more categories from the central facility to the principal vehicle;
(h) storing the user information at the principal vehicle;
(i) detecting a nearby secondary vehicle that is wirelessly accessible to the principal vehicle;

(j) transmitting the user information from the principal vehicle to the secondary vehicle;
(k) transmitting the one or more categories from the principal vehicle to the secondary vehicle;
(l) presenting the user information to a user of the secondary vehicle; and
(m) carrying out steps (j) and (l) when the categories transmitted to the secondary vehicle match one or more existing categories stored at the secondary vehicle.

16. A method as set forth in claim 15 further comprising, prior to step (i), the steps of:
   the user of the secondary vehicle selecting the one or more existing categories; and
   downloading the one or more existing categories to the secondary vehicle.

* * * * *